United States Patent
Melton

(10) Patent No.: US 9,307,853 B2
(45) Date of Patent: Apr. 12, 2016

(54) INSULATED DOUBLE WALLED DRINKING VESSEL AND METHOD OF MAKING THE SAME

(71) Applicant: Tervis Tumbler Company, North Venice, FL (US)

(72) Inventor: Thomas Melton, Englewood, FL (US)

(73) Assignee: Tervis Tumbler Company, North Venice, FL (US)

(*) Notice: Subject to any disclaimer, the term of this patent is extended or adjusted under 35 U.S.C. 154(b) by 0 days.

(21) Appl. No.: 14/694,496

(22) Filed: Apr. 23, 2015

(65) Prior Publication Data

US 2015/0313392 A1 Nov. 5, 2015

Related U.S. Application Data

(60) Provisional application No. 61/987,170, filed on May 1, 2014.

(51) Int. Cl.
*A47G 19/22* (2006.01)
*B29C 65/70* (2006.01)
*B29L 31/00* (2006.01)

(52) U.S. Cl.
CPC ........ *A47G 19/2288* (2013.01); *A47G 19/2205* (2013.01); *A47G 19/2227* (2013.01); *B29C 65/70* (2013.01); *A47G 2400/10* (2013.01); *B29L 2031/7158* (2013.01)

(58) Field of Classification Search
CPC ........ B65D 11/02; B65D 11/16; B29C 65/70; B29C 65/42; B29C 66/341; A47G 19/2205; A47G 19/2288; A47G 19/2227; A47G 19/22; A47G 2400/10

USPC ............ 264/248; 220/659, 656, 612, 592.27, 220/592.2, 592.17, 592.16
See application file for complete search history.

(56) References Cited

U.S. PATENT DOCUMENTS

| | | | | |
|---|---|---|---|---|
| 723,796 A | * | 3/1903 | Williams | ........... B65D 81/3869 220/568 |
| 3,002,646 A | | 10/1961 | Lewis | |

(Continued)

FOREIGN PATENT DOCUMENTS

| | | |
|---|---|---|
| DE | 202005001019 U1 | 3/2006 |
| GB | 959341 A | 5/1964 |
| GB | 2060816 A | 5/1981 |

OTHER PUBLICATIONS

English language abstract for DE 20 2005 001 019 U1 (2006).

(Continued)

*Primary Examiner* — Stephen Castellano
(74) *Attorney, Agent, or Firm* — Caesar Rivise, PC

(57) ABSTRACT

An insulated drinking vessel, e.g., a tumbler, and method of making the same is disclosed. The vessel basically comprises a pre-molded inner vessel formed of a plastic material having a sidewall is disposed within a pre-molded outer vessel formed of a plastic material having a sidewall to form a subassembly having an insulating air space between the sidewalls. Each of the vessels includes a contoured surface including at least one projection or depression. A ring of plastic material is molded in-situ on the contoured surfaces to cause portions thereof to melt and intermingle with the plastic material of the ring to form a homogenous joint having a depth no greater than approximately 0.003 inch. The ring forms the rim or lip of the insulated drinking vessel.

22 Claims, 2 Drawing Sheets

(56) References Cited

U.S. PATENT DOCUMENTS

| | | | |
|---|---|---|---|
| 3,247,302 A | 4/1966 | Lewis | |
| 4,872,569 A | 10/1989 | Bolte | |
| 4,886,187 A * | 12/1989 | Stewart | B29B 11/04 220/592.26 |
| 5,076,463 A * | 12/1991 | McGraw | A47G 19/2288 126/400 |
| 5,090,213 A | 2/1992 | Glassman | |
| 5,553,735 A | 9/1996 | Kimura | |
| 5,839,599 A | 11/1998 | Lin | |
| 6,050,443 A | 4/2000 | Tung | |
| 6,405,892 B1 | 6/2002 | Volan | |
| 6,419,108 B1 | 7/2002 | Toida et al. | |
| 6,921,179 B2 | 7/2005 | Ghanem | |
| D519,785 S | 5/2006 | Bodum | |
| D526,848 S | 8/2006 | Bodum | |
| D557,561 S | 12/2007 | Flowers et al. | |
| 7,306,113 B2 | 12/2007 | El-Saden et al. | |
| 8,684,223 B1 | 4/2014 | Kalamaras | |
| 2004/0212120 A1 | 10/2004 | Giraud | |
| 2005/0045643 A1 | 3/2005 | Ghanem | |
| 2005/0173365 A1 | 8/2005 | McKnight | |
| 2005/0194340 A1 | 9/2005 | Huang | |

OTHER PUBLICATIONS

International Search Report of PCT Application No. PCT/US2015/027720, dated Jul. 24, 2015.

* cited by examiner

# INSULATED DOUBLE WALLED DRINKING VESSEL AND METHOD OF MAKING THE SAME

CROSS-REFERENCE TO RELATED APPLICATIONS

This utility application claims the benefit under 35 U.S.C. §119(e) of Provisional Application Ser. No. 61/987,170 filed on May 1, 2014 entitled Insulated Doubled Walled Drinking Vessel And Method Of Making The Same. The entire disclosure of that provisional application is incorporated by reference herein.

FIELD OF THE INVENTION

This invention relates generally to drinking vessels and more particularly to insulated drinking vessels having a thin rim and methods of making the same.

BACKGROUND OF THE INVENTION

Double walled insulated drinking vessels are commercially available from various vendors. There are also numerous U.S. Patents and published patent applications directed to doubled walled insulated drinking vessels, such as glasses, mugs, goblets, wine glasses and the like. See for example, U.S. Patents and published applications: Ser. No. 4,872,569 (Bolte); U.S. Pat. No. 5,090,213 (Glassman); U.S. Pat. No. 5,553,735 (Kimura); U.S. Pat. No. 5,839,599 (Lin); U.S. Pat. No. 6,050,443 (Tung et al.); U.S. Pat. No. 6,405,892 (Volan); U.S. Pat. No. 6,419,108 (Toida et al.); U.S. Pat. No. 6,921,179 (Ghanem); U.S. Pat. No. 7,306,113 (El-Saden et al.); D519,785 (Bodum); D526,848 (Bodum); D557,561 (Flowers et al.); 2004/0212120 (Giraud); 2005/0045643 (Ghanem); 2005/0173365 (McKnight); and 2005/0194340 (Huang).

While the insulated drinking vessels of the foregoing prior art may be generally suitable for their intended purposes, a need exists for a double walled drinking vessel which has a thin, drinking lip, yet which is simple in construction, easy to produce and which when completed exhibits structural integrity consistent with an integrally molded unit.

In my co-pending non-provisional application Ser. No. 14/665,223, filed on Mar. 23, 2015, entitled Insulated Doubled Walled Drinking Vessel And Method Of Making The Same, which in turn claims priority from provisional application Ser. No. 61/982,439, filed on Apr. 22, 2014 entitled Insulated Doubled Walled Drinking Vessel And Method Of Making The Same, both of which applications are assigned to the same assignee as this invention and whose disclosures are incorporated by reference herein, there is disclosed and claimed a double walled insulated drinking vessel formed of a pre-molded plastic inner vessel disposed within a pre-molded plastic outer vessel and whose top portions are joined together by in-situ molding a plastic ring thereon to provide the lip or rim for the drinking vessel. The in-situ molding of the ring on the top portions of the inner and outer vessels produces a non-superficial homogenous joint thereat. That joint is in the range of approximately 0.003 inch to 0.100 inch thick, with the resulting molded double walled drinking vessel exhibiting the same properties as if it had been molded as an integral unit at one time, e.g., it exhibits the same resistance to breakage or other damage at the location of the joint as remainder of the unit.

If the in-situ molding of the ring is accomplished to produce a joint having a thickness less than 0.003 inch, it may be susceptible to breakage. Thus, a need exists for a double walled drinking vessel whose drinking lip or rim is produced by in-situ molding a ring on the top of the inner and outer vessels to create a joint of less than approximately 0.003 inch and which is resistant to breakage at that joint. The subject invention addresses that need.

SUMMARY OF THE INVENTION

In accordance with one aspect of this invention an insulated drinking vessel is provided. The insulated drinking vessel comprises an inner vessel, an outer vessel, and a ring. The inner vessel, the outer vessel and the ring are each formed of a plastic material, e.g., transparent copolyester. The inner vessel is pre-molded and includes a top edge portion. The outer vessel is also pre-molded and also includes a top edge portion. The pre-molded inner vessel is disposed within the pre-molded outer vessel with the top edge portion of the pre-molded inner vessel disposed adjacent the top edge portion of the pre-molded outer vessel. The top edge portion of the inner vessel has a contoured surface including at least one projection or depression. The top edge portion of the outer vessel has a contoured surface including at least one projection or depression. The ring is molded in-situ on the contoured surfaces of the pre-molded inner and outer vessels to cause the plastic material thereof to fuse together and intermingle with the plastic material of the ring to form a homogenous joint having a depth no greater than approximately 0.003 inch. The ring forms the lip of the double walled drinking vessel.

In accordance with one preferred aspect of this invention at least one projection or depression of the contoured surface of the inner vessel comprises an annular wall and wherein the at least one projection or depression of the contoured surface of the outer vessel comprises an annular wall.

In accordance with one preferred aspect of this invention the top edge portion of one of the pre-molded inner and outer vessels comprises an annular flange and wherein the top edge portion of the other of the pre-molded inner and outer vessels includes an annular recess for receipt of the annular flange.

In accordance with one preferred aspect of this invention the ring is thin and relatively long, and may be optionally colored, while the inner and outer vessels are transparent. A decorative item may be located within the insulating air space.

Another aspect of this invention constitutes methods of making an insulated double walled drinking vessel. For example, one method of this invention entails making an insulated drinking vessel by providing a pre-molded inner vessel formed of a plastic material and having a top edge portion. A pre-molded outer vessel formed of a plastic material and having a top edge portion is also provided. The top edge portion of the inner vessel has a contoured surface including at least one projection or depression. The top edge portion of the outer vessel has a contoured surface including at least one projection or depression. The pre-molded inner vessel is disposed within the pre-molded outer vessel so that the top edge portion of the inner vessel is disposed adjacent the top edge portion of the outer vessel. A ring of plastic material is then molded in-situ on the contoured top edge portions of the pre-molded inner and outer vessels to cause the plastic material thereof to fuse together and intermingle with the plastic material of the ring to form a homogenous joint of approximately less than 0.003 inch.

DETAILED DESCRIPTION OF THE PREFERRED EMBODIMENT

Figure 1:
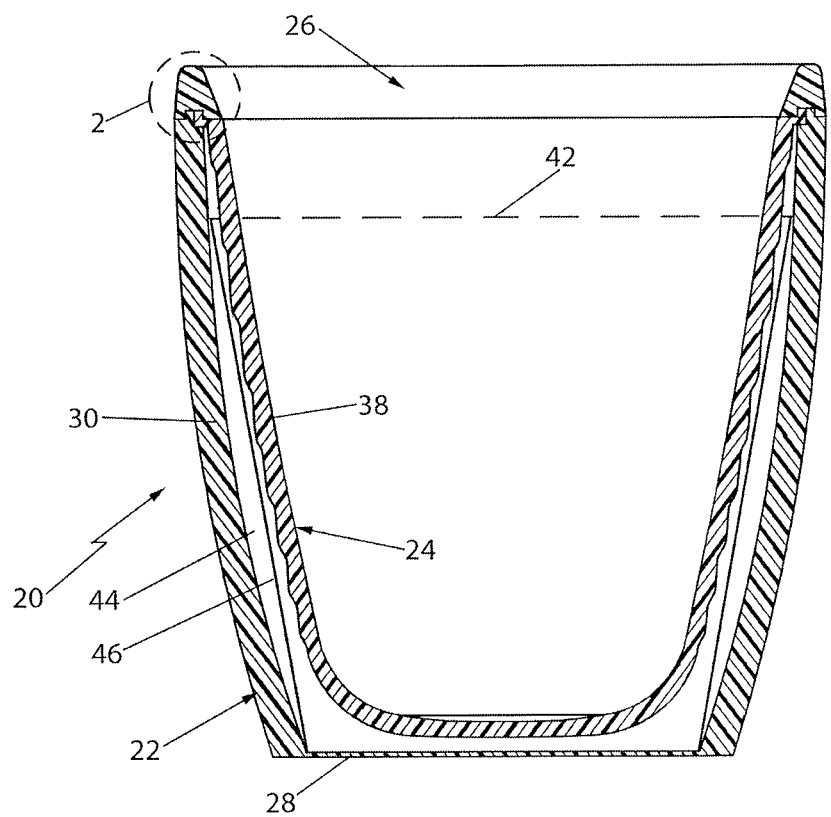
FIG. 1 is vertical sectional view of one exemplary insulated drinking vessel, e.g., a tumbler, constructed in accordance with one aspect of this invention.

Referring now to the various figures of the drawing wherein like reference characters refer to like parts, there is shown at 20 in FIG. 1 one exemplary embodiment of an insulated drinking vessel, e.g., a tumbler, constructed in accordance with this invention. The tumbler 20 basically comprises an outer vessel 22, an inner vessel 24, and a ring 26. The outer vessel 22 is an integral unit that is molded of any suitable transparent plastic material, e.g., Eastman Tritan™ copolyester sold by Eastman Chemical Company. Any suitable conventional molding technique, e.g., blow molding, injection molding, etc., can be used to form the outer vessel. What is important is that the outer vessel is a pre-molded component, i.e., is made prior to its use in the assembly of the vessel 20. The inner vessel 24 is also an integral unit that is also pre-molded of any suitable plastic material using any suitable conventional molding technique. In accordance with one preferred aspect of this invention the material making up the inner vessel is the same material as that of the outer vessel, e.g., Eastman Tritan™ copolyester.

The rim or lip of the insulated vessel 20 is formed by the ring 26. To that end, the ring is molded in-situ on the top surfaces of the inner and outer vessel in accordance with a method of this invention. That method will be described in detail later. Suffice it for now to state that the pre-molded inner vessel is disposed within the pre-molded outer vessel to form a subassembly which can then be placed within an injection molding machine (not shown), with the top surface 32 of a portion of the outer vessel 22 and the top surface of a portion of the inner vessel 24 in communication with a ring shaped mold cavity (not shown) in the injection molding machine. The ring shaped mold cavity is of any suitable thickness and height to form the rim or lip of a drinking vessel, e.g., it may have a thickness in the range of approximately 0.06 inch to 0.20 inch, and a height in the range of approximately 0.06 inch to 1 inch.

A molten plastic material, preferably the same material as that from which the outer and inner vessels were pre-molded, is injected under pressure into the mold cavity to fill the ring shaped portion of the cavity and thereby form the ring 26. The molten injected plastic forming the ring 26 also engages the exposed top surfaces of the outer and inner vessels to cause those surfaces to melt and reflow to a depth of less than approximately 0.003 inch, whereupon the injected plastic intermingles with the melted plastic of the outer and inner vessels, to form a homogeneous joint thereat, thereby integrally joining the two vessels to the in-situ molded ring. Since the depth of the joint is somewhat shallow, e.g., less than approximately 0.003 inch, the top surfaces of the inner and outer vessels onto which the ring in molded in-situ are contoured to provide a greater surface area than if those surfaces were completely flat, planar or otherwise un-contoured. The contouring of the top surfaces of the inner and outer vessels can be achieved by use of at least one projection and/or depression on each surface. In the exemplary embodiment shown in FIGS. 1 and 2, the contouring consists of one projection in the form of an annular wall projecting upward from the top surface of the inner vessel and one projection in the form of an annular wall projecting upward from the top surface of the outer vessel. Those projections are merely exemplary of a multitude of surface features that constitute either projections or depressions to produce a large surface area for the joint to be produced by the in-situ molding of the ring onto the top portions of the inner and outer vessels.

Irrespective of the shape and number of the projections/depressions used to form the contoured surfaces, the resulting molded drinking vessel is then allowed to cool to the point at which it can be removed from the injection molding machine and allowed to cool completely, whereupon the resulting molded double walled drinking vessel exhibits the same properties as if it had been molded as an integral unit at one time, e.g., it exhibits the same resistance to breakage or other damage at the location of the joint as remainder of the unit.

Figure 2:
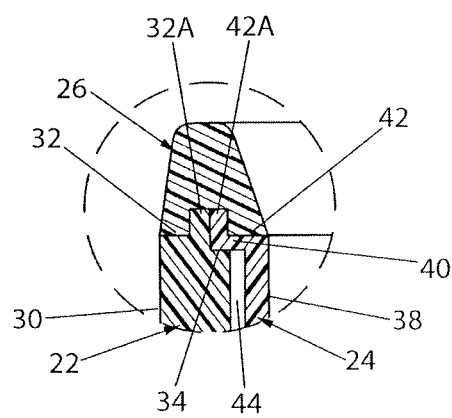
FIG. 2 is an enlarged sectional view of the portion of the insulated drinking vessel shown within the circle designated as 2 in FIG. 1.

As best seen in FIGS. 1 and 2, the outer vessel 22 includes a base wall 28 and a sidewall 30. The sidewall 30 is a surface of revolution and can be of any desired shape. In the exemplary embodiment it is shown as being slightly arcuate. As best seen in FIG. 2 the upper end of the sidewall 30 has a top surface 32 which includes an undercut annular recess or shelf 34. The shelf is arranged to receive a portion of an annular flange 40 of the inner vessel 24. The inner vessel 24 also includes a base wall 36 and a sidewall 38. The sidewall 38 is also a surface of revolution and can be of any desired shape. In the exemplary embodiment it is shown as being very slightly arcuate. The upper end of the sidewall 38 is in the form of the heretofore identified annular flange 40. The flange 40 has a top surface 42.

The top surface 32 of the outer vessel's sidewall 30 is in the form of the heretofore mentioned projection or annular wall. That wall is designated as 32A is approximately 0.04 inch in height and is approximately 0.04 inch in thickness and projects upward from the top surface 32 immediately adjacent the annular recess or shelf 34. The top surface 42 of the inner vessel's sidewall 38 is in the form of the heretofore mentioned projection or annular wall. That wall is designated as 42A is approximately 0.04 inch in height and is approximately 0.04 inch in thickness and projects upward from the top surface 42 at the periphery of the flange 40.

Figure 3:
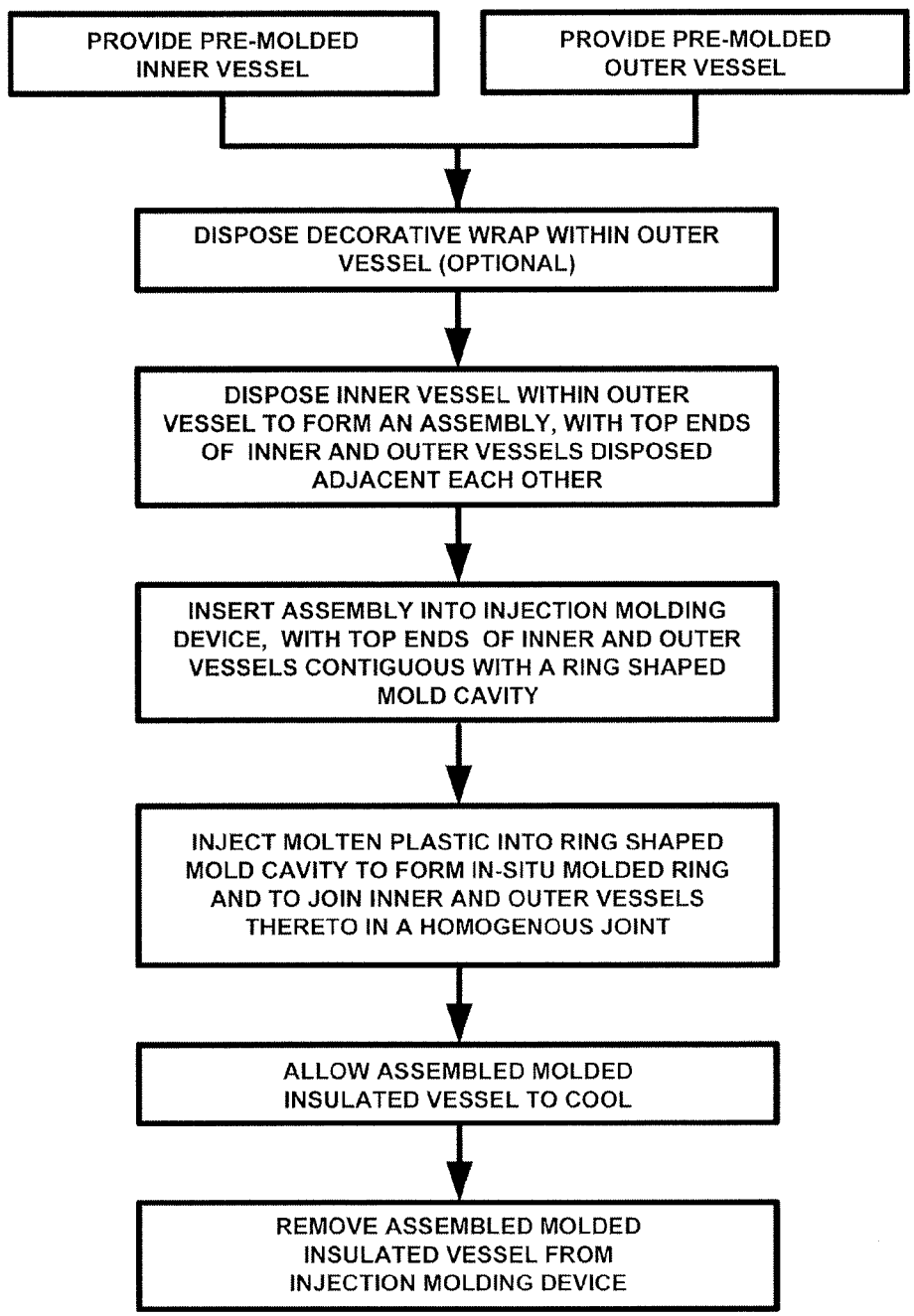
FIG. 3 is a block diagram of one exemplary method in accordance with this invention for making an insulated vessel, such as the insulated vessel shown in FIG. 1.

With the inner vessel disposed within the outer vessel, a peripheral portion of the flange 40 is received within the shelf 34, such as shown in FIG. 3, and with the annular wall 32A abutting the annular wall 42A to form the subassembly that is arranged to be placed into the injection molding machine so that the ring 26 can be molded in-situ on the top portions thereof as mentioned above.

It should be pointed out at this juncture, that the size of the shelf 34 and the size of the flange 40 are selected, so that when the pre-molded outer vessel with the pre-molded inner vessel within it is placed into the injection molding machine and pressure is applied to that subassembly a good fluid-tight pressure seal results at the interface of the shelf and flange. To that end, the outside diameter of the mold cavity which forms the ring 26 is chosen to be slightly larger, e.g., 0.40" than the outside diameter of the outer vessel, whereupon when pressure is applied to the outer vessel by the injection molding machine to form the fluid-tight seal between the flange of the inner vessel and the shelf of the outer vessel, the outer surface of the outer vessel will be flush with the outer surface of the ring 26 molded in-situ on the vessels. Moreover, the thickness of the flange and the depth of the shelf are selected to be greater than the depth that the plastic material of the inner and outer vessels will melt and reflow when the ring 26 is molded in-situ on those vessels to prevent the extant injection pressure and heat during the in-situ molding process from compromising the seal between the inner vessel and the outer vessel. Thus, for example, if the homogenous joint created by the in-situ molding of the ring on the vessels is less than 0.003 inch, the thickness of the flange and the depth of the recess should be at least 0.02 inch. Further still, the outside edge of the outer vessel should have a shutoff area that will create a homogenous seal that will not allow liquid the wick into the joint.

When the inner vessel 24 is disposed as just described within the outer vessel 22, the outer surface of the sidewall 38 of the inner vessel 24 is spaced from the inner surface of the sidewall 30 of the outer vessel 22 to form an insulating air space 44 therebetween. If desired, an optional, decorative item, e.g., a wrap, an embroidered emblem or patch, etc., can be disposed in the air space prior to the in-situ molding of the ring on those vessels to provide enhanced aesthetics for the vessel 20. In the exemplary embodiment shown in FIG. 1, the decorative item comprises a wrap 46. Irrespective of the construction of the decorative item, since it is disposed within the air space 44 and the sidewall of the outer vessel 22 is transparent, it will be visible through the transparent sidewalls 30 to provide enhanced aesthetics to the insulated vessel 20. Moreover, in the interest of aesthetics, the material forming the ring 26 may be colored to accentuate the rim and to coordinate with the ornamentation provided by the decorative item with in the insulated air space. For example, the decorative item within the air space may be a wrap or embroidered patch bearing a college logo in the college's colors, with the ring being colored to match one of the college's colors for emphasis.

Inasmuch as the ring 24 is molded in-situ on the outer and inner vessels, it is a simple matter to provide other structural features to the ring as it is molded in-situ on the vessels 22 and 24. For example, if desired a helical thread may be provided on the outer surface of the ring 26 to accommodate a threaded cap or lid for the insulated vessel 20. To that end, the mold cavity in which the ring is molded in-situ may include helical thread forming portion contiguous with the portion of the cavity forming the outer surface of the ring. Alternatively, the ring may be formed with an internal helical thread for a cap or lid. In such a case, the mold cavity may include helical thread forming portion contiguous with the portion of the cavity forming the inner surface of the ring. Other features can be molded into the ring during its formation, e.g., the top edge of the ring may include a portion of elevated height to form an enlarged lip for facilitating the drinking of a beverage from the vessel. A straw holder, not shown, may also be formed in the ring as the ring is molded in-situ on the vessels 22 and 24.

As mentioned above the method of making the insulated tumble 20 (or any other double walled insulated drinking vessel constructed in accordance with this invention) constitutes another aspect of this invention. To that end, as best seen in FIG. 3, the method entails providing a pre-molded inner vessel formed of a plastic material. That inner vessel is constructed as discussed earlier, e.g., it has a top edge portion and an annular flange. A pre-molded outer vessel formed of a plastic material is also provided. The outer vessel is also constructed as discussed earlier, e.g., it has a top edge portion, an annular recess or shelf, and an upstanding annular wall or projection forming the contoured surface. The pre-molded inner vessel is disposed within the pre-molded outer vessel to form a subassembly, with the top edge portion of the inner vessel is disposed adjacent the top edge portion of the outer vessel, e.g., a peripheral portion of the annular flange of the inner vessel disposed within the annular shelf of the outer vessel and with the annular wall projecting upward from the top surface of the inner vessel and abutting the annular wall projecting upward from the top surface of the outer vessel.

The subassembly is then inserted into an injection molding machine so that the subassembly is at the base of the injection molding machine's cavity contiguous with the portion of the ring-shaped mold cavity for forming the ring. The geometry of the molding machine cavity is such that a leak proof seal is created around the outside of the outer vessel 22, and a leak proof seal is created inside the inner vessel 24 when the mold is closed. This is accomplished by making the portion of the cavity that the outer vessel is nested in of a smaller diameter by at least 0.004 inch than the outer diameter of the portion of the cavity forming the outer surface of the ring. Moreover, it is desirable to have the mold cavity produce a land length of at least 0.060 inch and the inner core to have a diameter larger than the seal area of the inner by at least 0.004 inch and a land length of at least 0.060 inch.

The ring 26 is then molded in-situ on the top edge portions of the pre-molded inner and outer vessels, whereupon the heat and pressure applied causes the plastic material forming the ring to fuse together and intermingle with the re-flow (melted) plastic material of the inner and outer vessels to form a somewhat shallow homogenous joint and with the ring having outer surface that is flush with the outer surface of the outer vessel and an inner surface that is flush with the inner surface of the inner vessel. Moreover, the gating of the ring should be placed in such a way as to give maximum heat to the re-flow area. Thus, it is preferably located as close to the inner and outer re-flow area as possible. The parameters of the injection molding process are set in a way to create enough shear heat to re-flow the top surfaces of the inner vessel and outer vessel to form the non-superficial homogeneous joint. For example, in accordance with one exemplary process of this invention, barrel heats are set to a range between 530-560 degrees F. and pack and hold cavity pressures are between approximately 10,000 PSI to 12,000 PSI.

After the in-situ molding process is complete, the assembled/molded insulated vessel 20 is allowed to cool within the injection machine until the molten plastic has solidified sufficiently that the vessel can be removed. That completes the vessel 20. Another vessel can then be made in the injection molding machine in a similar manner as just described.

It should be pointed out at this juncture that the structure of the insulated drinking vessel and method or making it as described above are merely exemplary of various structures and methods that are contemplated by this invention. Thus, for example, the insulated vessel 20 of this invention is not limited to tumblers, and may be in the form of mugs, wine glasses, bottles, etc. Moreover, the sidewall portions of the vessels may be of other shapes and sizes than that shown in the drawing. What is important is that the upper rim of the vessel is molded in-situ on the pre-molded outer and inner vessels to produce a thin upper lip or rim formed of a single sidewall, while a substantial portion of the remainder of the insulated vessel below the ring is insulated via a double wall construction.

Without further elaboration the foregoing will so fully illustrate my invention that others may, by applying current or future knowledge, adopt the same for use under various conditions of service.

I claim:

1. An insulated drinking vessel comprising an inner vessel, an outer vessel, and a ring, said inner vessel, said outer vessel and said ring each being formed of a plastic material, said inner vessel being pre-molded and including a top edge portion, said outer vessel being pre-molded and including a top edge portion, said pre-molded inner vessel being disposed within said pre-molded outer vessel with said top edge portion of said pre-molded inner vessel being disposed adjacent said top edge portion of said pre-molded outer vessel, said top edge portion of said inner vessel having a contoured surface including at least one projection or depression, said top edge portion of said outer vessel having a contoured surface including at least one projection or depression, said ring being molded in-situ on said contoured surfaces of said pre-molded inner and outer vessels to cause the plastic material thereof to fuse together and intermingle with said plastic material of said ring to form a homogenous joint having a depth no greater than approximately 0.003 inch, said ring forming the lip of said drinking vessel.

2. The insulated drinking vessel of claim 1 wherein said plastic material of said pre-molded inner vessel, said pre-molded outer vessel and said ring is the same plastic material.

3. The insulated drinking vessel of claim 2 wherein said plastic material comprises copolyester.

4. The insulated drinking vessel of claim 1 wherein said top edge portion of one of said pre-molded inner and outer vessels comprises an annular flange and wherein said top edge portion of the other of said pre-molded inner and outer vessels includes an annular recess for receipt of said annular flange.

5. The insulated drinking vessel of claim 4 wherein said pre-molded inner vessel comprises said annular flange and wherein said pre-molded outer vessel comprises said annular recess.

6. The insulated drinking vessel of claim 1 wherein said pre-molded inner vessel, said pre-molded outer vessel and said ring are transparent.

7. The insulated drinking vessel of claim 1 wherein said pre-molded inner vessel and said pre-molded outer vessel are transparent and wherein said ring is colored.

8. The insulated drinking vessel of claim 1 wherein said at least one projection or depression of said contoured surface of said inner vessel comprises an annular wall and wherein said at least one projection or depression of said contoured surface of said outer vessel comprises an annular wall.

9. The insulated drinking vessel of claim 1 wherein said pre-molded inner vessel includes a sidewall and wherein said pre-molded outer vessel comprises a sidewall, and wherein portions of said sidewall of said pre-molded inner vessel are spaced from portions of said sidewall of said pre-molded outer vessel to form an insulating air space therebetween.

10. The insulated drinking vessel of claim 9 wherein said sidewall of said outer member is transparent and wherein said drinking vessel additionally comprising a decorative member disposed within said insulating air space and visible through said transparent sidewall.

11. A method for making an insulated drinking vessel comprising:
   a) providing a pre-molded inner vessel formed of a plastic material and having a top edge portion including a contoured surface including at least one projection or depression;
   b) providing a pre-molded outer vessel formed of a plastic material and having a top edge portion including a contoured surface including at least one projection or depression;
   c) disposing said inner vessel within said outer vessel whereupon said top edge portion of said inner vessel is disposed adjacent said top edge portion of said outer vessel; and
   d) molding a ring of plastic material in-situ on said contoured portions of said pre-molded inner and outer vessels to cause portions of the plastic material of said top edge portions thereof to fuse together and intermingle with said plastic material of said ring to form a homogenous joint having a depth no greater than approximately 0.003 inch, said ring forming the lip of said drinking vessel.

12. The method of claim 11 wherein said plastic material of said inner vessel, said outer vessel and said ring is the same plastic material.

13. The method of claim 12 wherein said plastic material comprises copolyester.

14. The method of claim 11 wherein said top edge portion of one of said pre-molded inner and outer vessels comprises an annular flange and wherein said top edge portion of the other of said pre-molded inner and outer vessels includes an annular recess for receipt of said annular flange.

15. The method of claim 14 wherein said pre-molded inner vessel comprises said annular flange and wherein said pre-molded outer vessel comprises said annular recess.

16. The method of claim 11 wherein said pre-molded inner vessel, said pre-molded outer vessel and said ring are transparent.

17. The method of claim 11 wherein said pre-molded inner vessel and said pre-molded outer vessel are transparent and wherein said ring is colored.

18. The method of claim 11 wherein said at least one projection or depression of said contoured surface of said inner vessel comprises an annular wall and wherein said at least one projection or depression of said contoured surface of said outer vessel comprises an annular wall.

19. The method of claim 11 wherein said inner vessel includes a sidewall and wherein said outer vessel comprises a sidewall, and wherein portions of said sidewall of said inner vessel are spaced from portions of said sidewall of said outer vessel to form an insulating air space therebetween when said inner vessel is disposed within said outer vessel.

20. The method of claim 19 additionally comprising disposing a decorative item within said insulating air space.

21. The method of claim 20 wherein said decorative item comprises a wrap.

22. An insulated drinking vessel produced by the method of claim 11.

* * * * *